United States Patent [19]

Ar

[11] Patent Number: 5,526,052
[45] Date of Patent: Jun. 11, 1996

[54] QUANTIZATION ADAPTIVE TO THE HUMAN VISUAL SYSTEM

[75] Inventor: Jun Sun Ar, Seoul, Rep. of Korea

[73] Assignee: Hyundai Electronics Ind. Co., Ltd., Kyeongki-do, Rep. of Korea

[21] Appl. No.: 198,868

[22] Filed: Feb. 18, 1994

[30] Foreign Application Priority Data

Feb. 25, 1993 [KR] Rep. of Korea .................... 1993-2678

[51] Int. Cl.$^6$ ..................................................... H04N 7/24
[52] U.S. Cl. ......................................... 348/405; 348/420
[58] Field of Search ................................. 348/419, 405, 348/416, 415, 409, 402, 401, 400, 390, 384, 420, 421

[56] References Cited

U.S. PATENT DOCUMENTS

| | | | |
|---|---|---|---|
| 4,984,076 | 1/1991 | Watanabe et al. | 348/405 |
| 5,144,426 | 9/1992 | Tanaka et al. | 348/416 |
| 5,245,427 | 9/1993 | Kunihiro | 348/409 |
| 5,285,276 | 2/1994 | Citta | 348/409 |
| 5,307,163 | 4/1994 | Hatano et al. | 348/415 |
| 5,315,326 | 5/1994 | Sugiyama | 348/409 |
| 5,317,397 | 5/1994 | Odaka et al. | 348/416 |
| 5,337,087 | 8/1994 | Mishima | 348/405 |
| 5,347,311 | 9/1994 | Golin | 348/416 |

FOREIGN PATENT DOCUMENTS

| | | | |
|---|---|---|---|
| 427653 | 5/1991 | European Pat. Off. | H04N 7/13 |
| 63-076687 | 4/1988 | Japan | H04N 7/133 |
| 4007989 | 1/1992 | Japan | H04N 7/133 |

*Primary Examiner*—Thai Q. Tran
*Assistant Examiner*—Bryan S. Tung
*Attorney, Agent, or Firm*—Wenderoth, Lind & Ponack

[57] ABSTRACT

An adaptive quantizing apparatus and method in HDTV according to the invention is capable of modifying a quantization spacing for the individual blocks to be processed in accordance with the human visual system, such as motion, complicatedness, brightness, etc. of a picture. To this end, a picture portion which is prone to present any conspicuous visual undesirable effects is tracked down and assigned a modified bit rate so that a bit rate is lowered for a picture portion where such undesirable effects, if they occur, should not be very conspicuous, decreasing the probability of enhancing the subject picture quality.

3 Claims, 4 Drawing Sheets

| 1 | 2 | 3 | 4 |
|---|---|---|---|
| 5 | 6 | 7 | 8 |

| $n = 1$ | $n = 2$ |
|---|---|
| $n = 3$ | $n = 4$ |

1

QUANTIZATION ADAPTIVE TO THE HUMAN VISUAL SYSTEM

BACKGROUND OF THE INVENTION

This invention relates to an adaptive-quantizing apparatus and method for high-resolution television, and particularly an adaptive-quantizing apparatus and method with quantization spacing being adjusted in accordance with the human visual system.

Generally, high definition television involves coding and decoding of digitized picture signals. The picture data in a digital form is superior to the analog form in effective storage and noise control and processing. Digitization of the picture data means generation of a tremendous amount of data. For instance, NTSC television signals are to be digitized to data of about 114 Mbp. If a color picture frame of 512 by 512 pixels with 8-bit color components for red, green and blue is transmitted at 2400 bps, it will take as long as the order of 44 minutes. This makes the compression technology particularly critical for efficiently storing and transmitting picture data.

There are two kinds of compression coding techniques, one for moving pictures eliminating overlappings between time-spaced frames, and another for still pictures eliminating spatial overlappings.

BRIEF DESCRIPTION OF THE DRAWINGS

In FIG. 1 reference numeral 1 designates a frame memory; 2, motion detector; 3, motion compensator; 4, discrete cosine transformer; 5, adaptive quantizer; 6, reverse quantizer; 7, reverse discrete cosine transformer; 8, variable length coder; 9, buffer; 10, picture analyzer; and 11, frame delay.

As shown in FIG. 1 a conventional adaptive quantizer comprises a frame memory 1 for storing a frame picture, a motion detector 2 for comparing the frame picture to an inputted picture to generate motion data, a motion compensator 3 for extracting a picture from the preliminarily stored frame in the frame memory in accordance with the motion data from the motion detector 2, a discrete cosine transformer 4 for transforming the inputted picture into an 8 by 8 block size with the data extracted by the motion compensator, an adaptive quantizer 5 for executing a quantization after determining a quantization spacing of the transformed coefficients from the transformer 4, a reverse quantizer 6 for restoring the adaptive-quantized data to discrete cosine transformation coefficients, a reverse discrete cosine transformer 7 for reproducing 9-bit pixel data from 12-bit coefficients from the reverse quantizer 6, a variable length coder 8 for executing a variable length coding on the quantized discrete cosine transformation coefficients and other data, and a buffer 9 for adjusting the output from the variable length coder at a determined bit rate. With commonly known algorithms, such as CCITT H.261, and Motion Picture Expert Group (MPEG) or HDTV algorithm, used in this conventional type of the apparatus for compression of the digital picture data for storage and transmission, control means are provided for the buffer for controlling the rate of output of the coding apparatus to a determined bit rate. In particular MPEG only proposed a method taking into account the degree of complexity of a picture to be treated, which does not achieve a good effective use of the adaptive quantization. No boundary treatment is performed during a step of determining the picture complexity, so that the conventional apparatus eventually worsens the picture quality in the boundary region.

SUMMARY OF THE INVENTION

The object of the invention is to provide an adaptive quantizing apparatus and method whereby the quantization spacing can be modified or adjusted in the individual blocks to be treated on a basis of motion, picture complexity and brightness as perceived by the human visual system, avoiding the above state disadvantages.

The other object of the invention is to provide an adaptive quantizing apparatus and method using execution of an algorithm for detecting a boundary for enhancing accurateness of detection of picture complexity, and for detecting motion and brightness for executing an adaptive quantizing in addition to the picture complexity for utilizing the human visual system.

According to the invention provided is an adaptive quantizing apparatus which comprises a picture analyzer for analyzing an input picture to discriminate a picture portion to be finely coded from that to be less finely coded, a frame delay for delaying the input picture by one frame, a frame memory for storing a preliminarily input frame picture, a motion detector for comparing the frame data stored in the frame memory and input picture data delayed by one frame by the frame delay to generate motion data, a motion compensator for extracting a picture from the frame stored in the frame memory in accordance with the motion data generated by the motion detector, a discrete cosine transformer for discrete cosine transforming the one-frame delayed picture to an 8 by 8 block size with the picture extracted by the motion compensator, an adaptive quantizer for executing an adaptive quantization with a spacing after determining a quantization spacing of the transformed coefficients from the transformer with the data transmitted from the picture analyzer and the buffer, a reverse quantizer for restoring the quantized data to the discrete cosine transform coefficients, a reverse discrete cosine transformer for returning the 12-bit data from the reverse quantizer to 9-bit pixel data, a variable length coder for variable length coding the quantized discrete cosine transform coefficients and other data, and a buffer for adjusting the bit rate of the output from the variable length coder.

DETAILED DESCRIPTION OF THE PREFERRED EMBODIMENTS

Figure 1:
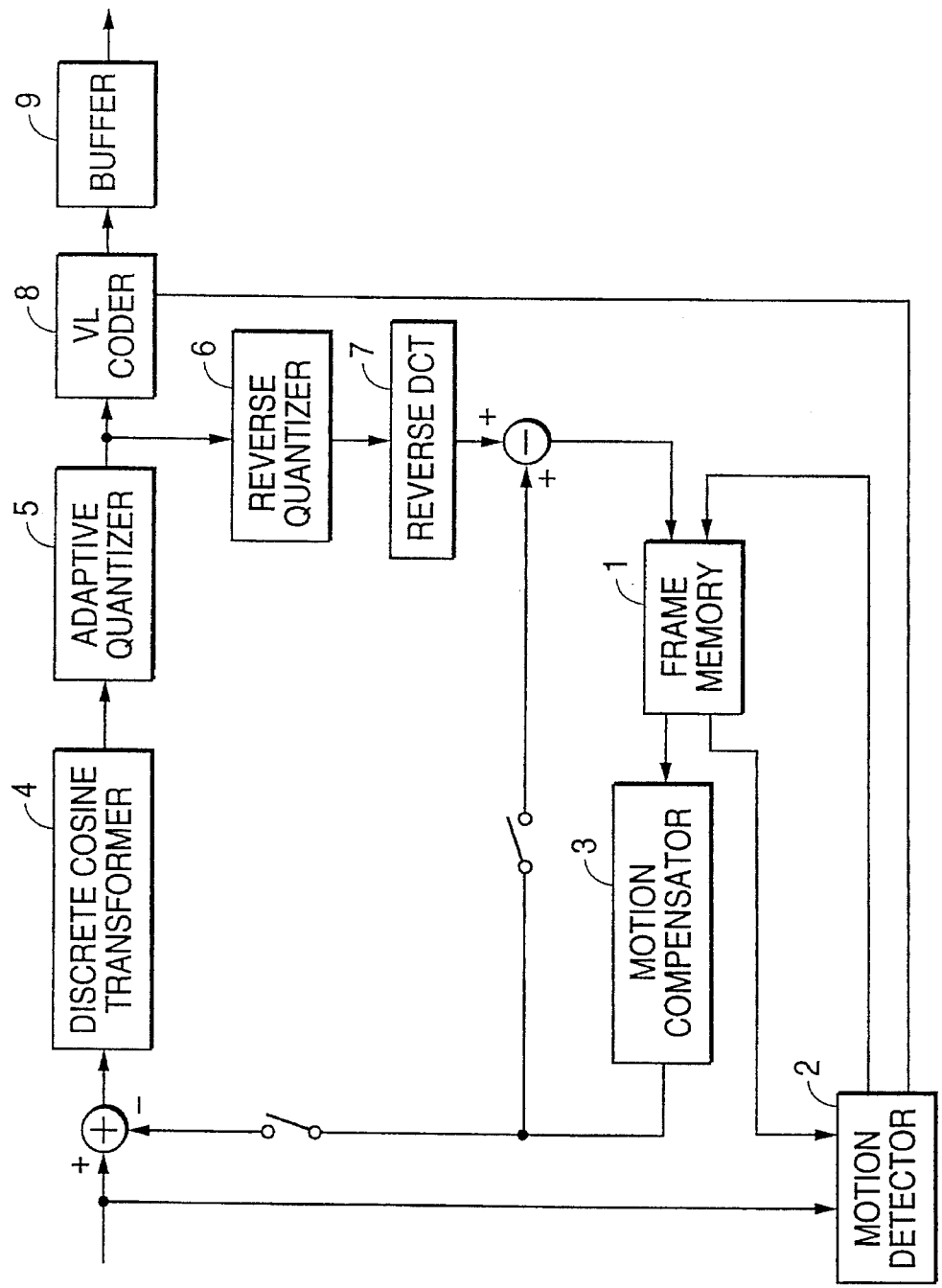
FIG. 1 shows a block diagram of a conventional adaptive-quantizing apparatus.
Figure 2:
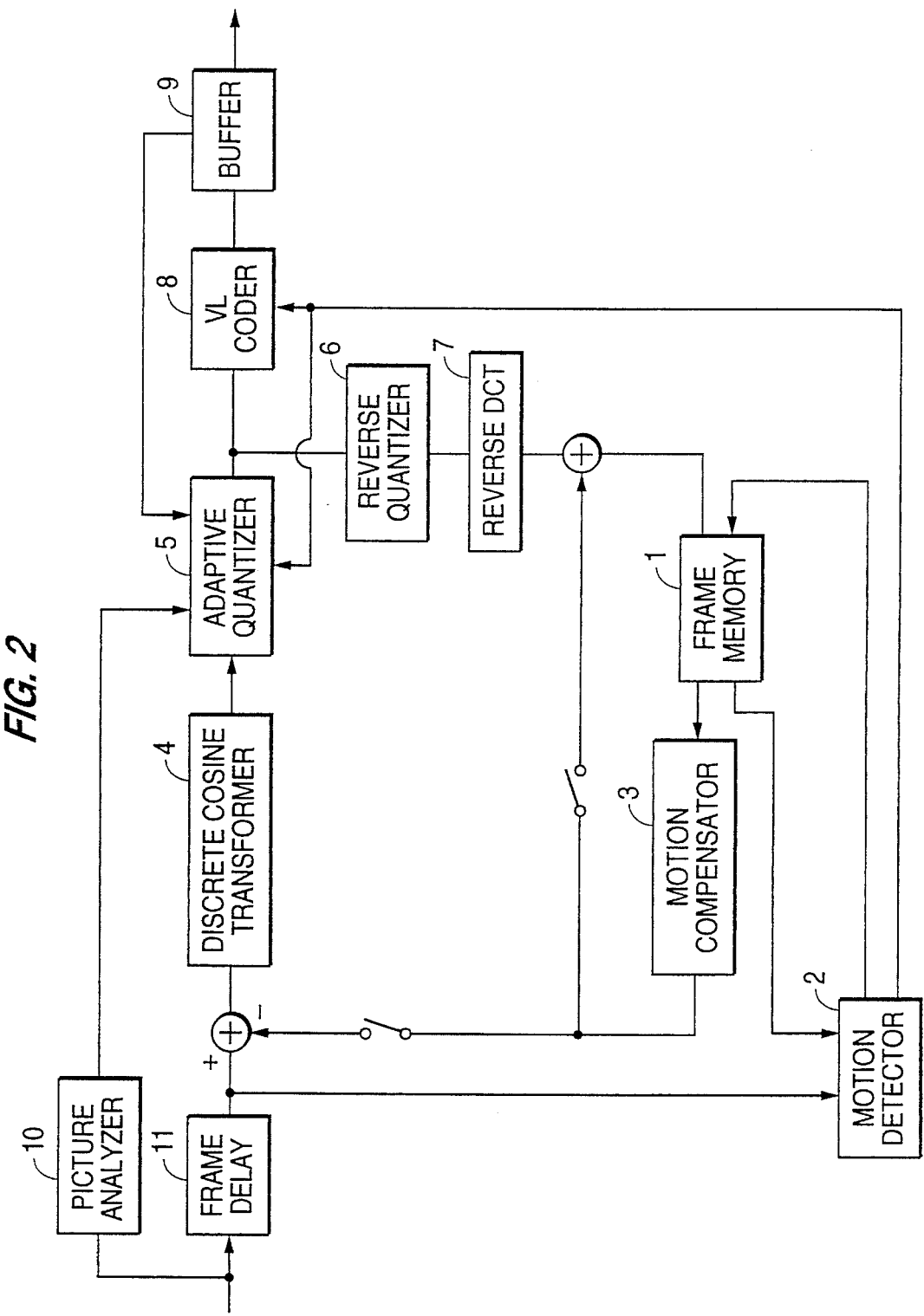
FIG. 2 is similar to FIG. 1, but showing an adaptive-quantizing apparatus according to the invention.

An embodiment of the invention is described with reference to FIG. 2 showing a block diagram of an adaptive quantizing apparatus embodied by the invention. It comprises a picture analyzer 10 for analyzing an input picture to discriminate a picture portion to be finely coded from that to be less finely coded, a frame delay 11 for delaying the inputted picture by one frame, a frame memory 1 for storing a preliminarily input frame picture, a motion detector 2 for comparing the frame data stored in the frame memory and input picture data delayed by one frame by the frame delay to generate motion data, a motion compensator 3 for extracting a picture from the frame stored in the frame memory in accordance with the motion data generated by the motion detector, a discrete cosine transformer 4 for discrete cosine transforming the one-frame delayed picture to an 8 by 8 block size with the picture extracted by the motion compensator, an adaptive quantizer 5 for executing an adaptive quantization with a spacing after determining a quantization spacing of the transformed coefficients from the transformer with the data transmitted from the picture analyzer and the buffer, a reverse quantizer 6 for restoring the quantized data to the discrete cosine transform coefficients, a reverse discrete cosine transformer 7 for returning the 12-bit data from the reverse quantizer to 9-bit pixel data, a variable length coder 8 for variable length coding the quantized discrete cosine transform coefficients and other data, and a buffer 9 for adjusting the bit rate of the output from the variable length coder.

The apparatus operates as will be described. A picture is applied to the picture analyzer 10 and the frame delay 11. The analyzer analyzes the applied picture and derives coded data adaptive to the human visual system. The adaptive coded data will dictate coding to a substantial digress a spatial frequency band to which the human vision is sensitive while limiting the amount of the picture representative data for the remaining portion, thereby changing the degree of codification in accordance with the human visual system.

If a picture is coded at a too low bit rate, the eventual picture will be susceptible to conspicuous effects, such as blocking effect, color bleeding, etc. A picture portion or portions which are susceptible to such adverse effects to the human view are searched for and a bit assignment for those portions is modified so that the other portion where any equal effects if occurred should not be conspicuous and is assigned a low bit rate, thus improving the subjective quality of the picture.

Necessary factors signifying a picture portion susceptible of conspicuously adverse effects to the human view should be determined. They are picture complexity, boundary, motion, scene change and brightness. All of these factors are determined in a macroblock for determining a motion vector, except for the picture variation which is determined by the unit of frame.

Computation technique for the respective factors will be described. The picture picture complexity which is utilized on a basis that human visual sensitivity will decrease with the more complicated picture has been computed by an equation with variance as a first macroblock variance $V_{bi}$:

$$V_{bi}=[\Sigma S_n^2-(\Sigma S_n)^2]/N_{pm} \quad (1)$$

where $S_n$ is pixel value and $N_{pm}$ is the number of the macroblocks. The picture complexity is thus determined as $V_{bi}$ by this method which may miscalculate picture complexity in the boundary region with the flat background. To rectify the value, an algorithm for detecting the boundary is necessary.

Figures 3, 4, 5:
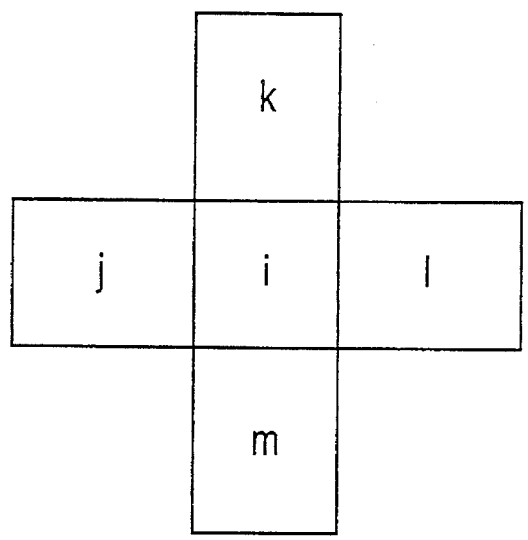
FIG. 3 shows a lay-out of macroblocks used for extracting a boundary region.
FIG. 4 shows a microblock layout within a macroblock.
FIG. 5 shows a 4-area segmentation of frame.

The boundary is detected by a technique which will be described with reference to FIGS. 3 through 5 where microblocks are a unit for the discrete cosine transformation. To determine whether there is a boundary in an i-th block, initially, variances $V_{bi}$ of the surrounding four j-, k-, l-, and m-th macroblocks are compared to that of the i-th block, and if the difference relative to each of the $V_{bi}$'s of the four blocks is greater than a determined value, then it is determined to contain a boundary.

The algorithm may be performed as follows:

```
flag = 0
for (k = 0; k < 4; k = k + 1)
if (Vbx < 500 && (Vbi − Vbx) > 250) flag = flag + 1
if (flag > = 1) Ei_1 = 1
else Ei_1 = 0
``` where x is for macroblocks j, k, l, and m.

In other words, if a variance of x-th macroblock is less than 500 and a difference between the variance of i-th block and that of the x-th block is more than 250, $E_{i-i}=1$, i.e. the condition that the i-th block contains a boundary is true. If otherwise, it is false ($E_{i-i}=0$) or it is determined that the block does not contain a boundary. Thus, the algorithm will detect substantially all the boundaries presented in macroblocks, and fail to detect those in microblocks so that a visually adverse effect in the boundary regions in microblocks remains conspicuous.

To cope with this phenomenon, a boundary in macroblock will be detected with complicatedness and mean values thereof of eight microblock into which a macroblock is separated. The algorithm for this detection may be performed as follows:

```
flag_m = 0
flag_v = 0
flag_v2 = 0
for (k = 0; k < 8; K = k + 1){
    if (mean(k) > 100) then flag_m = flag_m + 1
    if (var(k) > 1000) then flag_m = flag_v + 1
    if (var(k) < 200) then flag_m = flag_v2 + 1}
if (flag_m > 4 && (flag_v > = 2 && flag_v < = 4) &&
        flag_v2 > = 4) Ei_2 = 1
else Ei_2 = 0
``` where mean (k) is a mean pixel value of k-th microblock; var (k) is a complicatedness of k-th microblock.

The final boundary information (Ei) is thus determined by the two algorithms in combination:

```
if (Ei_1 = 1 or Ei_2 = 1) Ei = 1
else Ei = 0
```

The fact that more motion in a picture proportionally decreases sensitivity of the human vision has been well-known and utilized in the field of picture data processing. An algorithm for detecting motion in a macroblock to be processed is necessary for determining motion information in accordance with which quantization spacing is modified. A motion vector for macroblocks can be used as motion information according to the invention, but may be generated for a flat face with no motion. Such erroneous information has to be filtered out. To this end, the motion vector undergoes the MPEG proposed algorithm for motion detection:

```
if (bd < = 1,0)
    mc = 0
else if (bd < = 3 && 0.5 * bd < = dbd)
    mc = 0
else if (bd > 3 && 0.9 * db < = dbd)
    mc = 0
else
    mc = 1
``` where bd is mean difference between a preliminarily stored frame and a current frame macroblock for the same location; dbd is the mean difference between a stored frame macroblock preliminarily stored by the motion vector and a current frame macroblock.

To put the motion detection algorithm in other words, if bd equals or less than 1, then motion is determined as absent or mc=0. If bd is less than 3 or if bd equals 3 and its 0.5 time value equals or is less than dbd, then it is determined as absent.

If db is more than 3 and its 0.9 time value equals or is less than dbd, it is again determined as absent. If any other is the case, motion is detected as present or mc=1.

The motion information thus obtained will be useless as a factor for modification of the quantization spacing if a picture does not have continuity with a picture scene change or if the current frame is separate from the preliminarily stored frame. The scene change information is utilized to make the picture motion information meaningful. The scene change information is extracted by comparing variances of macroblock means minimum of each of the four regions of a frame to those of a stored one. It is determined by the algorithm:

```
Vmcn = [ΣM²cni – (ΣMcni)²]/Nrn
Vmpn = [ΣM²pni – (ΣMpni)²]/Nrn (n = 1,2,3,4)
flag = 0
for (k = 0; k < 4; k = k + 1)
if ((Vmcn – Vmpn) > (Vmpn * 0.1)) flag = flag + 1
if (flag > = 2) then scene_change = on
else scene_change = off
``` where Vmcn is a variance of mean pixel value of an n-th region of the current frame; Vmpn is similar but about the preliminarily stored frame; Mcni and Mpni are mean pixel values of an i-th macroblock of the n-th region of each frame; and Nrn is the number of macroblocks contained in one region. In computation of the change information, if the below requirement is met and the flag value equals 3 or more, it is determined that picture scene changes.

$$(Vmcn-Vmpn) > (Vmpn * 0.1)$$

If otherwise, it is determined that the opposite is true.

Brightness information is utilized to decrease the number of generated bits on a basis of the fact that the human view is less sensitive to the less bright portions. The information on brightness is directly based on a mean pixel value of each macroblock.

The algorithm is as follows:

$$if\ (Mi<63)\ then\ Bi=(63-Mi)/63\times 20$$

where Mi is a motion information value.

Figure 6:
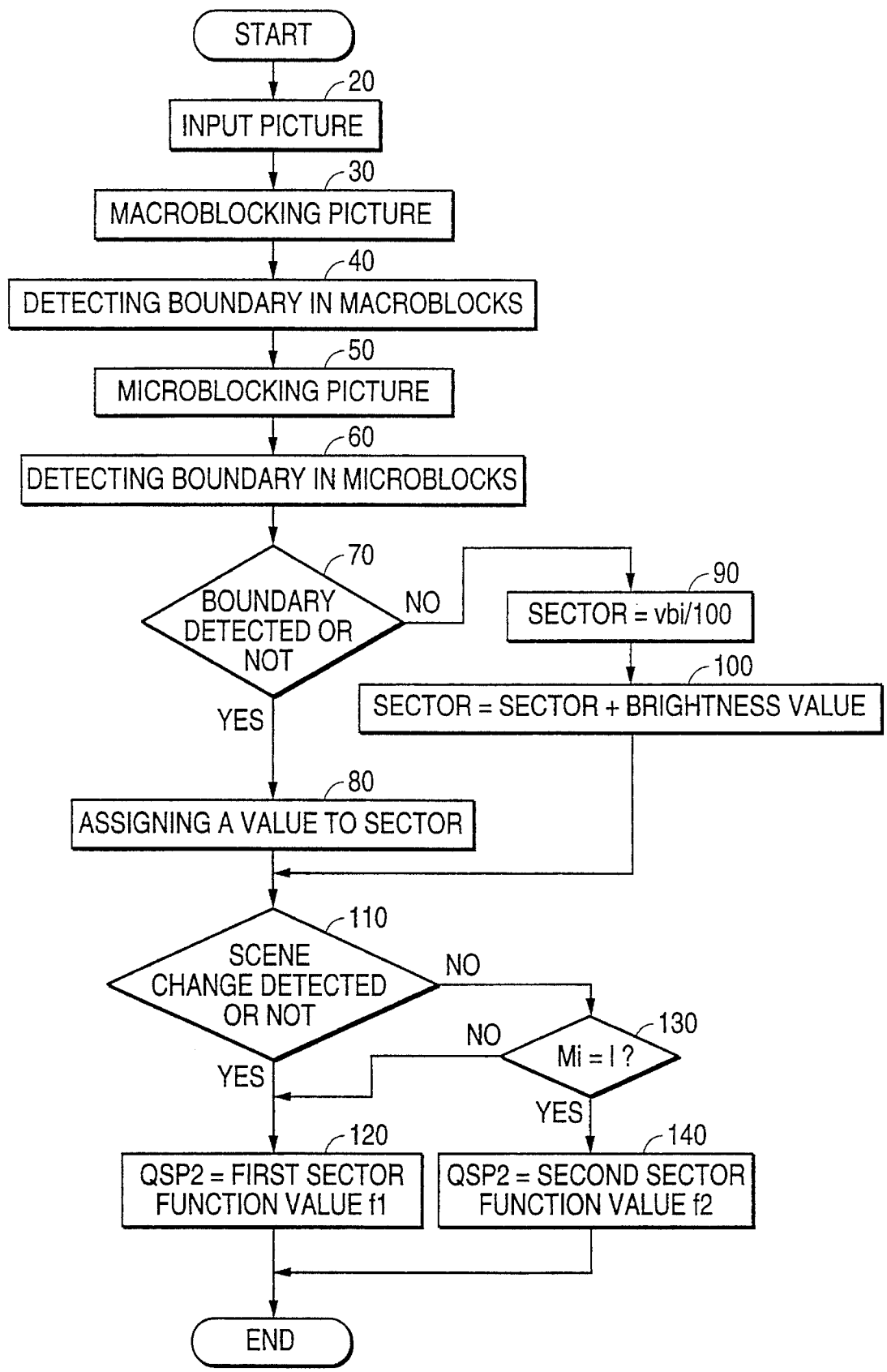
FIG. 6 shows a chart of a process for determining human visual system coefficient values to determine the quantization spacings.

A method will be described for calculating a quantization spacing from a quantization spacing parameter QSP1 determined with repletion of the buffer 9 and a secondary parameter QSP2 determined from the factors determined by the above described techniques. The secondary quantization spacing parameter QSP2 or human visual system parameter is obtained by a procedure shown in the flow chart of FIG. 6. A first stage in the process as shown in FIG. 6 comprises steps 20 to 60 for determining the presence of a boundary for macroblocks and microblocks. This is followed by a second stage comprising steps 70 to 100 for equalizing a sector value to 4 if Ei=1, i.e., if a macroblock contains a boundary or to a variance of the macroblock if otherwise and adding the brightness information Bi to the sector value to generate a final sector value. A third stage consists of steps 110 to 120 for calculating a human visual system parameter QSP2 from a first sector function Fi if a scene change SC occurs. A fourth stage has steps 130 to 140 for determining a human visual system parameter QSP2 as either of first or second sector functions f1 or f2 in accordance with motion information Mi if a scene change does not occur.

The first and second sector functions are determined by:

f1(Sector)=(2×Sector+avg-vb) / (Sector+2×avg-vb) and f2(Sector)=(3×Sector+avg-vb) / (Sector+3×avg-vb)

where avg-vb is a mean variance.

The final quantization spacings Qs is determined by Qs=QSP1×QSP2, and is applied to the adaptive quantizer 5 in FIG. 2 where quantization spacing is calculated from the quantization spacing information and repletion data of the buffer 9 thereby to quantize the coefficients from the discrete cosine transformer 4. In short, a quantization spacing at which the coefficients from the discrete cosine transformer are to be quantized are determined from the various factors or parameters obtained by the picture analyzer while the inputted picture is being delayed by one frame by the frame delay, and the repletion data from the buffer at each slice, taking into account motion data detected for macroblocks by the motion detector.

It has been obvious form the foregoing that this invention permits tracking down a picture portion where adverse effects such as blocking effect and color bleeding which are prone to occur in a flat picture portion and in a boundary region with a background, respectively, as particularly coded at too a small a bit rate will be conspicuous to the human visual system, and assigning more bits thereto while reducing the number of bits for other portions or portions where any such effects if occur will not be conspicuous, thus decreasing the probability of occurrence of the blocking effect and color bleeding to enhance the subjective quality of a reproduced picture.

What is claimed is:

1. An adaptive quantizing method for calculating an adaptive quantization spacing in HDTV comprising:

a first step of dividing data defining an HDTV picture into macroblocks and microblocks;

a second step of determining for each macroblock and microblock the presence of a boundary passing therethrough;

a third step of setting a sector value to a predetermined value if a macroblock contains a boundary or, if no boundary passes through said macroblock, setting said sector value to a value equal to a mean variance of the macroblock plus a brightness value based upon the mean pixel value for said macroblock to generate a final sector value;

a fourth step of calculating a human visual system parameter QSP2 from a first sector function value f1 if a scene change occur, a fifth step of setting said human visual system parameter QSP2 equal to a first sector function value if motion is not detected and a scene change has not occurred, or setting said human visual system parameter QSP2 equal to a second section function value f2 if motion is detected and a scene change has not occurred.

2. The adaptive quantizing method of claim 1 where the presence of a boundary and brightness value are detected for each macroblock and wherein said scene change is detected for each frame, respectively.

3. The adaptive quantizing method of claim 1 where said first and second sector function values, f1, and f2, respectively, are calculated from a predetermined mathematical relationship relating said sector value and said mean variance calculated in said third step.

* * * * *